United States Patent
Hutz

(10) Patent No.: US 10,740,821 B1
(45) Date of Patent: Aug. 11, 2020

(54) METHOD, SYSTEM, AND MANUFACTURE FOR LIGHTING EVALUATION TECHNOLOGY

(71) Applicant: Alarm.com Incorporated, Tysons, VA (US)

(72) Inventor: David James Hutz, Herndon, VA (US)

(73) Assignee: Alarm.com Incorporated, Tysons, VA (US)

( * ) Notice: Subject to any disclaimer, the term of this patent is extended or adjusted under 35 U.S.C. 154(b) by 740 days.

(21) Appl. No.: 15/203,952

(22) Filed: Jul. 7, 2016

Related U.S. Application Data

(60) Provisional application No. 62/189,405, filed on Jul. 7, 2015.

(51) Int. Cl.
*G06Q 30/00* (2012.01)
*G06Q 30/06* (2012.01)
*G06F 16/9535* (2019.01)

(52) U.S. Cl.
CPC ..... *G06Q 30/0631* (2013.01); *G06F 16/9535* (2019.01); *G06Q 30/06* (2013.01); *G06Q 30/0623* (2013.01); *G06Q 30/0627* (2013.01); *G06Q 30/0629* (2013.01); *G06Q 30/0641* (2013.01)

(58) Field of Classification Search
CPC ............... G06Q 30/0601–0645; G06Q 30/08
USPC ................................................. 705/26.1–27.2
See application file for complete search history.

(56) References Cited

U.S. PATENT DOCUMENTS

| | | | |
|---|---|---|---|
| 2010/0289643 A1* | 11/2010 | Trundle | G08C 19/16 340/545.1 |
| 2011/0025497 A1* | 2/2011 | Zaveruha | F21V 23/0442 340/540 |
| 2013/0132365 A1* | 5/2013 | Chang | G06Q 30/0241 707/710 |
| 2013/0201658 A1* | 8/2013 | Bogart | F21V 15/00 362/95 |
| 2016/0335698 A1* | 11/2016 | Jones | G06Q 30/0629 |

OTHER PUBLICATIONS

Crist, Ry, Stack's new smart bulb detects motion even though lampsades, Apr. 26, 2016, cnet, accessed at [https://www.cnet.com/reviews/stack-classic-smart-led-starter-kit-preview/] (Year: 2016).*

\* cited by examiner

*Primary Examiner* — Jeffrey A. Smith
*Assistant Examiner* — Lindsey B Smith
(74) *Attorney, Agent, or Firm* — Fish & Richardson P.C.

(57) ABSTRACT

Lighting evaluation technology, in which lighting usage information for an area is collected and analyzed. Through the use of one or more devices in communication with a light source device that collects usage data, lighting system usage information may be analyzed and meaningful results may be provided to the user. Such results may help to inform the user of one or more light bulb products which may be recommended for use in the particular area evaluated.

19 Claims, 5 Drawing Sheets

METHOD, SYSTEM, AND MANUFACTURE FOR LIGHTING EVALUATION TECHNOLOGY

CROSS-REFERENCE TO RELATED APPLICATION

This application claims the benefit of U.S. Provisional Application No. 62/189,405, filed Jul. 7, 2015, which is herein incorporated by reference.

TECHNICAL FIELD

This disclosure relates to lighting technology.

BACKGROUND

Homes may include lighting systems that a user may control based on light levels perceived by the user. For example, a user may interact with a lighting switch or, in a connected home system, a control panel, to activate and deactivate a light source in a room of the home.

SUMMARY

Techniques are described for lighting evaluation technology.

In some implementations, input which defines attributes of a property may be received and light source usage patterns of the property are monitored over time. Attributes of one or more commercially-available lighting products are also monitored. Various attributes of the property's electric utility provider may also be monitored. One or more commercially-available light source products may be selected based at least in part on one or more of the monitored attributes of the property, light source usage patterns, lighting products, and electric utilities. An operation may be performed on the basis of the one or more selected light source products.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

Techniques are described for evaluating a lighting system. In some implementations, a user may seek to replace one or more light sources within their home or business or gain insight about their energy usage patterns. In these implementations, a light source may be monitored to conduct an evaluation of a particular location within the user's home or business. Through the use of one or more devices in communication with light sources, the data collected about the light sources may be analyzed and meaningful results may be provided to the user. Such results may help to inform the user of one or more light bulb products which may be the most cost effective for use in the particular area evaluated.

Figure 1:
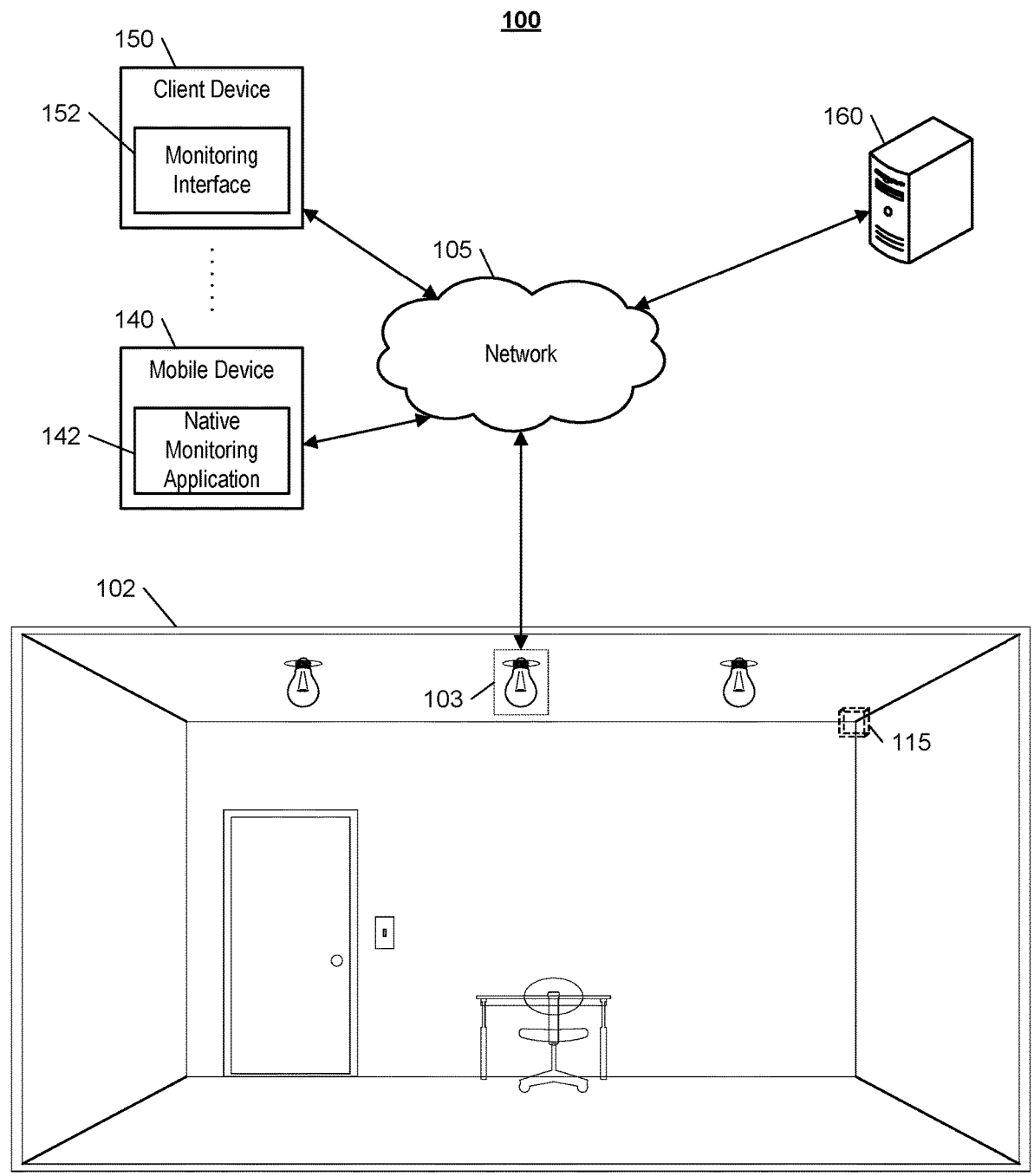
FIG. 1 illustrates an example system.

FIG. 1 illustrates an example of an electronic system 100 configured to provide lighting evaluation services. The system 100 includes an observational light source 103, one or more user devices 140, 150, and a remote monitoring server 160. The observational light source 103 is a relatively small and affordable lighting element that also collects data which may indicate the usage patterns of the lights provided in a room 102. In some implementations, the observational light source 103 is a light bulb that includes additional electronics programmed to provide its observational functionality. In these implementations, the observational light source 103 may be installed in various lighting sockets, making it a convenient household retrofit.

The observational light source 103 may, for instance, be installed in one of the lighting sockets of room 102 by a user wishing to evaluate the lighting usage patterns for room 102. Specifically, the observational light source 103 may monitor a number of times its lighting element is activated and durations of time activated, for example. Because the observational light source 103 is provided along a same circuit as the other light sources depicted in room 102, this data collected may be representative of usage patterns for the entirety of the lighting system included in room 102. Over time, the observational light source 103 may collect enough data so as to provide an adequate picture of the conditions under which the lighting system included in room 102 is utilized and relied upon. Ultimately, the user may be presented with the data collected, analytics performed on historical data, and various recommendations tailored to the lighting conditions of room 102.

The network 105 is configured to enable exchange of electronic communications between devices connected to the network 105. For example, the network 105 may be configured to enable exchange of electronic communications between the observational light source 103, the one or more user devices 140, 150, and the remote monitoring server 160. The observational light source 103 may communicate at least a portion of the data it collects to the remote monitoring server 160. The remote monitoring server 160 may utilize the data provided by the observational light source 103, along with data provided by one or more other sources, such as the Internet, to perform analytics and develop recommendations as desired by the user. For example, the remote monitoring server 160 may utilize data, such as that which has been described above, to provide the user of room 102 with suggestions regarding a type of light bulb to install in the room 102. Such a suggestion may, for instance, be made on the basis of recommending a lighting product to the user of room 102 that has been predicted to provide the user with the most savings. In this example, the remote monitoring server 160 may utilize historical data provided by the observational light source 103, pull data from websites of light bulb retailers that are nearby the house in which the room 102 is located, and match the room 102 with one or more particular lighting products so as to maximize cost effectiveness.

The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 105 may include multiple networks or subnetworks, each of which may include, for example, a wired or wireless data pathway. The network 105 may include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The observational light source 103 may be directly or indirectly in communication with network 105. In some implementations, the observational light source 103 may communicate with network 105 by way of a gateway device. Such a gateway device may be a communication device configured to exchange short range wireless communications with the observational light source 103 over a communication link and long range wireless communications with the remote monitoring server 160 over the network 105. Because the gateway device exchanges short range wireless communications with the observational light source 103, the gateway device is positioned nearby the observational light source 103. The gateway device and the observational light source 103 may, for instance, both be located within the house in which the room 102 is located, which is remote (and may be very far away from) the remote monitoring server 160.

In some implementations, the house may be a property monitored by an alarm system. In such implementations, the gateway device may be integral to the alarm system with remote monitoring server 160 providing one or more monitoring services in association with the alarm system. In some examples, the gateway device may include a wireless communication device configured to exchange long range communications over a wireless data channel. In this example, the gateway device may transmit header data and lighting system usage data over a wireless data channel. The gateway device may include one or more of an LTE module, a GSM module, a radio modem, cellular transmission module, or any type of module configured to exchange communications in one of the following formats: LTE, GSM or GPRS, CDMA, EDGE or EGPRS, EV-DO or EVDO, or UMTS.

The one or more user devices 140, 150 are devices that host and display user interfaces. In some examples, at least a portion of the data, analytics, and recommendations produced in connection with the observational light source 103 may be shared with one or more users through the user interfaces of devices 140 and/or 150. For instance, the user device 140 is a mobile device that hosts one or more native applications (e.g., the native monitoring application 142). The user device 140 may be a cellular phone or a non-cellular locally networked device with a display. The user device 140 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 140 may perform functions unrelated to the monitoring system, such as placing personal telephone calls, playing music, playing video, displaying pictures, browsing the Internet, maintaining an electronic calendar, etc.

The user device 140 includes a native monitoring application 142. The native monitoring application 142 refers to a software/firmware program running on the corresponding mobile device that enables the user interface and features described throughout. The user device 140 may load or install the native monitoring application 142 based on data received over a network or data received from local media. The native monitoring application 142 runs on mobile device platforms, such as iPhone, iPod touch, Blackberry, Google Android, Windows Mobile, etc. The native monitoring application 142 may, for instance, enable the user device 140 to receive and process image and sensor data from the monitoring system in some implementations.

The user device 150 may be a general-purpose computer (e.g., a desktop personal computer, a workstation, or a laptop computer) that is configured to communicate with the remote monitoring server 160 and/or a monitoring system control unit over the network 105. The user device 150 may be configured to display a monitoring user interface 152 that is generated by the user device 150 or generated by the remote monitoring server 160. For example, the user device 150 may be configured to display a user interface (e.g., a web page) provided by the remote monitoring server 160 that enables a user to perceive data collected by the observational light source 103, lighting system analytics, and/or lighting system recommendations. Although FIG. 1 illustrates two user devices for brevity, actual implementations may include more (and, perhaps, many more) or fewer user devices. In some implementations, the observational light source 103 may be in direct communication with one or more of user devices 140 and 150. In these implementations, system 100 may not rely upon remote monitoring server 160 to perform the functions described herein and may rather rely upon one or more of user devices 140 and 150 to render lighting evaluation services and/or results.

The one or more user devices 140, 150 may communicate directly with the sensors and other devices included in room 102. In some implementations, the one or more user devices 140, 150 may replace a monitoring system control unit or control panel and perform the functions of the monitoring system control unit for local control, monitoring, and lighting evaluation, as well as long range or offsite communication.

In some implementations, data from one or more additional electronic devices 115 provided in room 102 may be utilized to produce analytics and recommendations, such as those described above. For example, the one or more additional electronic devices 115 may include a motion sensor, which may be a Passive Infra Red (PIR) motion sensor, a microwave motion sensor, or any type of sensor that detects motion in an area corresponding to an area of room 102, which may be illuminated by the lighting system to which the observational light source 103 belongs. The one or more additional electronic devices 115 may communicate with network 105 in a manner similar to that which has been described above in association with the observational light source 103. In some implementations, the additional electronic devices 115 may be in direct communication with one or more of user devices 140 and 150 in a manner similar to that which has been described above in reference to observational light source 103. The data provided by a motion sensor may, for instance, shed light on a capacity in which the lighting system of the room 102 is unnecessarily activated, e.g., the lights are on but no one is present in the room 102. Door sensors configured to detect whether doors to rooms are in open or closed configurations also may be useful, alone or in combination with motion sensor data, in determining user presence and room usage patterns. Analytics performed on the basis of such data may be helpful in raising a user's awareness of their energy-usage habits. In some examples, the additional electronic devices 115 may communicate with other devices in system 100 on behalf of the observational light source 103.

In some implementations, data that indicates one or more attributes of the property in which the observational light source 103 is installed may be provided to the one or more electronic devices which perform analytics, develop recommendations, and present resulting data to users. For instance, the user of room 102 may utilize one or more devices 140, 150 to define one or more attributes for their property. In examples where the observational light source 103 is implemented as part of an alarm system for monitoring the property in which the room 102 is located, these attributes may be defined by the user of room 102 in a registration process. In some examples, such information may indicate the specific room in which the observational light source 103 is installed, the quantity of lighting sources that are utilized in that room, the types of lighting sources that are utilized in that room, the sizes of lighting sources that are utilized in that room, the fittings of lighting sources that are utilized in that room, and the like. This type of information may be indicated for an entire household so as to reflect their current lighting practices. Information pertinent to the property in which room 102 is located may be utilized as well. For example, the address of the user's home or other information indicative of location, e.g., GPS coordinates, may be utilized. In some examples, pricing information for electricity distributed to the household in which the room 102 is located may also be utilized. The remote monitoring server 160 may, for instance, rely upon one or more of the pieces of information described above to perform higher-level lighting analysis for the user of room 102.

In addition, the electronic system 100 includes a rules engine. The rules engine is an interpreter operated by the observational light source 103, a gateway device, alarm system control panel, and the like. The rules engine is able to interpret and run relatively small interpreted scripts. The interpreted scripts may define any combination of possible operations the electronic system 100 performs and may define rules based on any of the input available to the electronic system 100.

In some implementations, the rules engine is made up of two main components: a programming language interpreter that executes scripts/programs, and a trigger manager that decides which script/program to execute in response to a given event.

The scripts define the functionality of components in the electronic system 100. In particular, the scripts may include one or more instructions or rules that, when executed by the rules engine, define the manner in which signals received by the electronic system 100 are to be handled. The scripts are designed to be small in size (e.g., a size that is a little larger than an alarm code or signal) because they define a specific functionality selected by a user. Therefore, communicating the scripts may require minimal communication bandwidth and development time.

For example, the rules engine may provide the rules that govern how the observational light source 103 collects data for analysis. The remote monitoring server 160 may, for instance, receive data collected by the observational light source 103 and then process the received data by accessing data from various other sources, performing analytics, developing recommendations, and presenting such information to the user.

In some examples, a process may be performed for creating and sending a script to the observational light source 103 and/or defining processing performed by the remote monitoring server 160. The process begins when a user device, such as one or more of user devices 140 and 150, initiates communication with the remote monitoring server 160. In response to the initiation of communication, the monitoring server 160 presents an interface to the user device. The interface enables a user to create a script for use in evaluating lighting conditions in room 102 using the observational light source 103. Specifically, the interface is configured to accept one or more parameters provided by the user. In some implementations, the one or more parameters are variables that may be used to customize an instruction template. In other implementations, the one or more parameters provided by the user are terms in a programming language used by the user to flexibly define an instruction for the observational light source 103.

In some implementations, the interface provided to the user device may be one or more webpages. In other implementations, the interface provided to the user device may be a standalone application running on the user device. In some examples, such an interface may be made available to user devices 140 and/or 150 by way of native monitoring application 142 and/or monitoring interface 152, respectively. In implementations where the property in which the room 102 is located includes an alarm system, such an interface may be provided on a control panel associated with the alarm system. However, the interface may take any form through which parameters may be specified by a user of the user device.

The remote monitoring server 160 receives the one or more parameters or rules from the user device. The one or more parameters or rules define monitoring performed by the observational light source 103 (e.g., through a script that the remote monitoring server 160 delivers to the observational light source 103) and analysis operations performed by the remote monitoring server 160. In some implementations, these rules may take on the basic form: if X, then Y. In these implementations, the parameters received from the user device may be used to define X and Y. For example, a rule may specify that "if the observational light source 103 indicates that the lights in room 102 are activated AND the output of motion sensor 115 indicates that no one is present in room 102, then the remote monitoring server 160 classifies such time activated as time in which the lighting system of room 102 was activated while completely vacant." In another example, a rule may specify that "if the observational light source 103 has collected X number of weeks' worth of lighting usage data, then the remote monitoring server 160 develops a recommendation based the X number of weeks' worth of lighting usage data and provides it to Y." However, the rules are not limited to this basic format and may include any combination of loops, variables, conditional statements, and any other logical constructs. In some implementations, the remote monitoring server 160 reconfigures the observational light source 103 based on one or more of the received parameters. The remote monitoring server 160 may, for instance, provide one or more scripts to the observational light source 103 that, when received by the observational light source 103, enable a reconfiguration of the observational light source 103 to take place in accordance with the parameters. In another example, the recommendations described herein may be developed and delivered upon occurrence of price changes in light bulb products. For instance, such changes may be detected through one or more of Internet crawling or scraping operations performed by the remote monitoring server 160, or a device in communication with the remote monitoring server 160, in pursuit of identifying one or more suitable light bulb products, as described in more detail below.

In some implementations, rules exist in the context of events, triggers, and actions. Specifically, rules may determine what actions should be taken in response to an event that satisfies a trigger: Events→Triggers→Rules→Actions.

Events can be anything components of the electronic system 100 can generate. Triggers are the link between events and rules. Rules may be executed in response to such events. Triggers are what determine which event invokes which rule.

For example, in the case where the observational light source 103 collects data that indicates usage patterns for the lighting system of room 102, an event may be the point at which the observational light source 103 has collected one week's worth of such usage data, e.g., the satisfaction of a time-based threshold of one-week. One week's worth of data may, for instance, be considered to be an amount of data that the remote monitoring server 160 may be able to perform various analyses on with a relatively high-degree of confidence. In other words, the electronic system 100 may consider one weeks' worth of data to provide an ample representation of type of use the lighting system of room 102 receives.

As described above, the triggers may act as interrupts. Thus, when one of the triggers is set off, it may cause one or more corresponding scripts to be executed by the rules engine. For example, a first trigger may be linked to a first set of scripts that are associated with first and second rules. Thus, when the first trigger is set off, the first and second scripts are executed. Similarly, a second trigger may be linked to a second set of scripts that are associated with a third rule and a third trigger may be linked to a third set of scripts that are associated with fourth and fifth rules.

The observational light source 103 may determine that a condition specified by the received interpreted script has been met based on a comparison between the detected event or the received signal and the parameters included in the received interpreted script. In other words, execution of the monitoring script causes a determination to be made whether the detected event or the received signal satisfies parameters included in a rule of the monitoring script (e.g., the condition of the rule). If the condition of the rule is met, then the observational light source 103 triggers an action associated with the rule of the monitoring script.

The presence of rules/metadata on the observational light source 103 may be used to derive intelligence to exact more efficient behavior and affordable deployments of the observational light source 103. For instance, the remote monitoring server 160 may use monitoring scripts with rules, events, and triggers to tell the observational light source 103 when usage data should be transmitted and when it should not be transmitted. Through that capability, a service based on the observational light source 103 may be offered much more efficiently via the one or more channels over which the observational light source 103 and the remote monitoring server 160 communicate. Connection to back-end intelligence, such as that which may be provided in association with the remote monitoring server 160, may be leveraged to adapt the operation of the observational light source 103 based on any of data available to the back-end.

In addition, scripts operated by the rules engine may enable a variety of additional functionality. Also, scripts may define dynamic observational light source 103 behavior depending on the state of the motion sensor 115, the state of other sensors or electronic devices in the property, and/or the state of other electronic devices in communication with network 105, such as user devices 140 and 150. Scripts may define operations for the observational light source 103 to transmit a data usage index, instead of raw output, so that usage data can, if needed, be queried dynamically with transmission costs only incurred when needed.

By using the rules engine, parameters and results of lighting evaluation processes may be made easily accessible to one or more remotely-located electronic devices. Any of the inputs and actions described throughout this disclosure may be adapted using the rules engine and the processes described above, or may be implemented using other suitable technical processes.

Although the rule-based functions of system 100 have described above in association with a rules engine, it is to be understood that one or more of these functions may be implemented using another framework for accepting and employing user-defined conditions. That is, logic associated with the predetermined and user-configured lighting evaluation processes described herein may be implemented within system 100 using instructions which, for example, may be provided by a software application, a program, a piece of code, a device, a computer, a computer system, or a combination thereof, which independently or collectively direct operations of system 100. The instructions may be embodied permanently or temporarily in any type of machine, component, equipment, or other physical storage medium that is capable of being used by devices of system 100.

Figure 2:
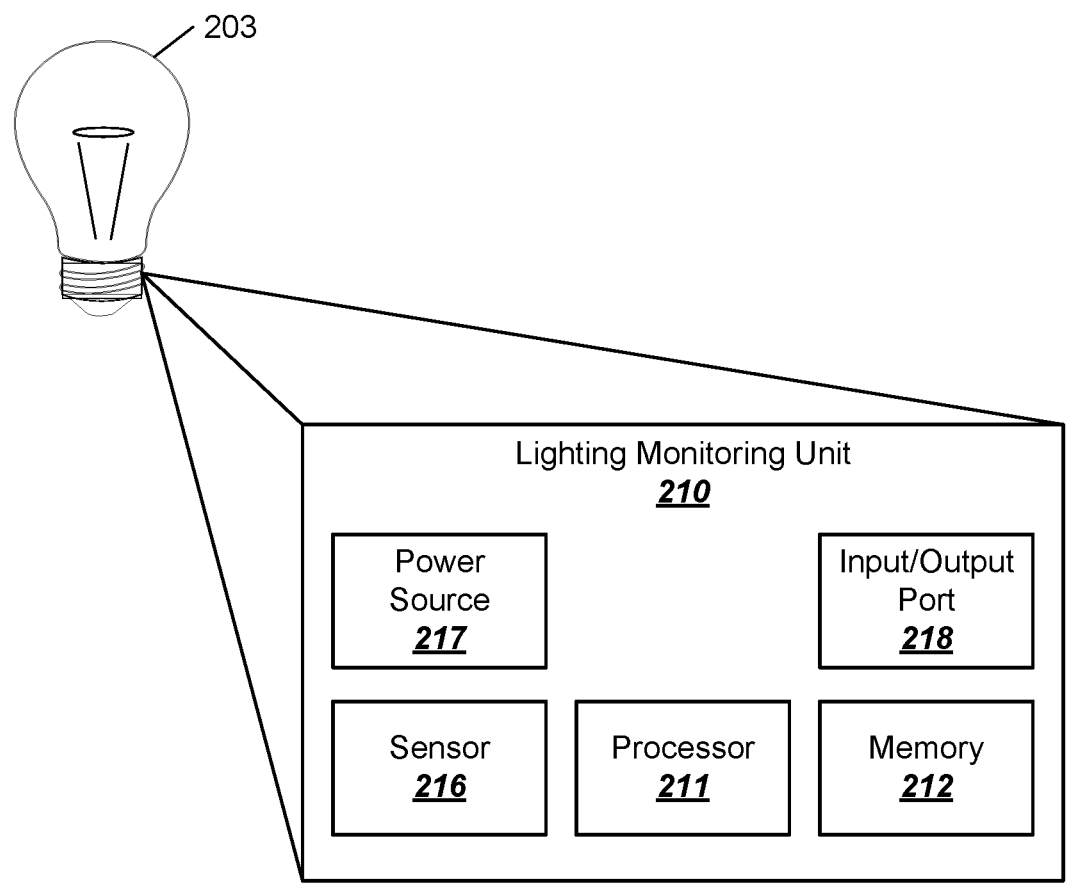
FIG. 2 illustrates an example light source and monitoring unit.

FIG. 2 illustrates an example light source 203 that includes a lighting monitoring unit 210. The lighting monitoring unit 210 may be used as a lighting monitoring unit integral with observational light source 103 shown in FIG. 1, and as any lighting monitoring unit or lighting monitoring unit referred to throughout this disclosure. The actual lighting element provided as the light source may be any kind of light source as described herein. The lighting monitoring unit 210 includes a processor 211, a memory 212, a sensor 216, a power source 217, and an input/output port 218. The processor 211 controls operations of the lighting monitoring unit 210 and may be any suitable processor. The memory 212 stores instructions that are executed by the processor 211 and also stores output of sensor 216. The memory 212 may be any type of memory that is capable storing data and may include a combination of multiple, memory units. For example, the memory 212 may be a Flash memory component that stores both instructions that are executed by the processor and output of sensor 216.

The sensor 216 is the sensing unit of the lighting monitoring unit 210 that may enable monitoring of light source activation. The sensor 216 may, for instance, include a sensor which measures the current and/or voltage being applied to the light source 203 by the socket in which it is installed. In this example, the sensor 216 may include an ammeter, voltmeter, power or a semiconductor device such as a transistor. In some implementations, the sensor 216 may monitor other characteristics of the light source 203. For instance, an illumination sensor or thermal sensor may detect and output data that is indicative of the state of the light source 203 in that the observational light source 203 would illuminate in an "on" state, produce heat, and vice versa. Regardless of implementation, the output of sensor 216 indicates the state of the light source 203, e.g., on or off. The output of sensor 216 may be handled by processor 211 and memory 212 and ultimately provided to one or more other electronic devices for analysis.

In some implementations, the sensor 216 may be integral to lighting monitoring unit 210. In other implementations, the sensor 216 may be physically separate from lighting monitoring unit 210. For example, sensor 216 may include one or more photodetectors that sense light or other electromagnetic energy using various types of sensors. The sensor 216 may, for instance, include one or more active-pixel sensors, charged-couple devices (CCDs), photodiode light sensors, or other types of optical detectors. The sensor 216 may be configured to detect the light produced by the one or more light sources 203 in various regions within the property (e.g., different rooms) as well as natural light from the sun. For example, the sensor 216 may measure the composition of natural light within various regions of the property to determine if a threshold level of natural light within the property is satisfied so that turning off one or more light sources 203 would still provide sufficient illumination of the property.

In some implementations, the sensor 216 may be an optical spectrum analyzers that may include a broadband spectrometer and wavelength meter to detect the optical spectrum of light from visible light. For example, the sensor 216 may perform measurements of spectra of the light sensed by the sensor 216. In some instances, the sensor 216 may include a diffraction grating to use a grating-based monochromator to mechanically scan the grating and measure relative energies of light at each wavelength. In another instance, the sensor 216 may include a diffraction grating and a sensor that simultaneously measures the relative energy of diffracted light corresponding to each wavelength.

In some implementations, the sensor 216 may additionally or alternatively distinguish natural light from artificial light based on absorption or reflection profiles for window glass within particular room within the property. The sensor 216 may be configured to determine an absorption or reflection profile of window glass or the atmosphere, and adjust the expected spectra for natural light based on the absorption or reflection profile. For example, the sensor 216 may determine that a particular window glass absorbs or reflects light in a particular wavelength range, and in response, reduce the intensity of light for that particular wavelength range in a spectra expected for natural light as sunlight passing through the window glass from outside may have light in the particular wavelength range be absorbed or reflected by the window glass, and use the adjusted spectra for determining an amount of sensed light attributed to natural light and an amount of sensed light attributed to artificial light. In a more particular example, if a particular window glass in a room absorbs and reflects red light, a light sensor may use an absorption profile that indicates that natural light is expected to a have lower intensities in the red light range than natural light would typically be expected to have.

The sensor 216 may determine the absorption or reflection profile based on calibration. For example, a user may indicate to the light source 203 that a room is currently only illuminated by natural light, and the light sensor 216 may determine an absorption or reflection profile of window glass or the atmosphere based the currently sensed light.

In some implementations, the sensor 216 may exchange communications with incident light meters placed on the windows that measure the intensity of incoming sunlight from outside and provide attributes of the incoming sunlight such as tones, colors, or intensity values. In another example, the sensor 216 may exchange communications with reflected light meters that may measure the reflectance of the incoming sunlight after it is incident upon the surface of the windows. Multiple incident or reflected light meters may also generate absorption/reflectance profiles for various rooms within the property.

In some instances, the generated absorption/reflection profiles may be used by the components of the system 100 and/or 200 to distinguish incoming sunlight from the light generated by the light source 203, other light sources within a room in the property, and natural light. For example, the incident or reflectance light meters may initially be calibrated by taking baseline readings when the light sources are turned off to determine the reflectance or absorption due to incoming sunlight. The baseline absorption/reflectance profiles may then be utilized in lighting evaluation to determine, based at least on the measured absorption/reflectance, when light source 203 or other light sources are activated and deactivated. In some implementations, various characteristics of natural lighting conditions, such as those determined at least in part by sensor 216, may be utilized in determining the most suitable lighting source for the room.

The power source 217 is the power source of the lighting monitoring unit 210 and may be any type of power source capable of delivering power to the lighting monitoring unit 210. In some implementations, the power source 217 may be a battery. Such a battery may have a relatively small size and may be a standard type of battery available for purchase at retail stores. The battery may be located in a compartment that is easily accessible to a user of the lighting monitoring unit 210 to facilitate changing of the battery, which may occur relatively frequently (e.g., every couple of months) depending on the power consumption settings of the lighting monitoring unit 210. In some implementations, the power source 217 may utilize power made available from the lighting socket in which the observational light source 203 is installed. In these implementations, the power source 217 may allocate a portion of the power received through the socket connection to powering the lighting monitoring unit 210 and/or may utilize a portion of the power received through the socket connection to keep a battery included in the power source 217 charged.

The input/output port 218 is a communication interface through which the lighting monitoring unit 210 may send and receive communications. For example, the input/output port 218 may allow the light source 203 to communicate readings from sensor 216 to electronic devices included in one or more networks. The input/output port 218 may, using a short range wireless protocol (e.g., Bluetooth, Z-Wave, ZigBee, local wireless 900 MHz communication band, etc.), receive and send short range wireless communications with other devices, such as a gateway device or control panel that is part of a monitoring system for a property in which the lighting monitoring unit 210 is located. The input/output port 218 also may include a module that enables long range wireless communications. For instance, the input/output port 218 may include a LTE or GSM module that enables communications over a cellular network. In some implementations, the input/output port 218 includes a wired communication module that enables wired communications.

In these implementations, the wired communication module may be an Ethernet port that enables communications over an Internet Protocol based network. The wired communication module may also be a Power-line communication (PLC) port that enables communications over a network on conductors that are in electrical connection to the socket in which the light source 203 is installed. This may allow the lighting monitoring unit 210 to easily communicate with other devices in the same household, such as a gateway device or control panel that is part of a monitoring system for a property in which the lighting monitoring unit 210 is located. The input/output port 218 may also be configured to communicate directly with a remote server (e.g., the monitoring server 160 shown in FIG. 1) that receives data from and controls configuration of the lighting monitoring unit 210.

In some examples, multiple light sources may be in communicate with a same gateway device, control panel, and/or monitoring server. The multiple light sources may also come in a variety of types, sizes, wattages, and fittings. In these examples, identifiers may allow a gateway device, control panel, and/or monitoring server differentiate between each light source. In some implementations, the memory 212 may store one or more identifiers that indicate the identity of the light source 203. Such identifiers may indicate the specific type, size, wattage, fitting, and the like of the light source 203. These identifiers may be included in some or all outgoing communications from the light source 203. This information may, for instance, allow for additional analytics to be performed on a user's lighting system. One or more rules, such as those which have been described above in association with FIG. 1, may dictate certain actions on the basis of the identity of the light source 203.

In some implementations, the system described in association with FIGS. 1 and 2 (e.g., system 100) may generate light profiles for particular rooms within the property based on historical measurements made by lighting monitoring units. For example, one or more devices such as a monitoring system control unit, control panel, user device and remote monitoring server, may track the light measurements made by the lighting monitoring unit 210 over a particular period of time (e.g., six months) to create a light profile for a room that includes trends in the amount of light produced from the light sources or incoming sunlight from the windows. The system 100 may then compare subsequent light measurements to the light profile to determine if there may be a change in the room that may impact the light measurements. For example, if the walls of the rooms are painted, the furniture is reoriented within the room, or the windows are changed, the system 100 may detect a corresponding shift in the light profile based on comparing the light measurements after the change to the light profile. In such examples, the system 100 may re-calibrate the light profile given the adjustments. The light profile may indicate an effect on sensed spectra. For example, a light profile may indicate that the walls of a room are red so that sensed natural light and artificial light that may be reflected off the walls may be expected to have more intensity in wavelengths corresponding to the color red than normal.

In some implementations, the power source 217 may rely upon power made available from the lighting socket in which the observational light source 203 is installed for most or all of its powering needs. In these implementations, the lighting monitoring unit 210 may be a relatively thin client that does not include a sensor 216. Instead, the lighting monitoring unit 210 may be polled by one or more devices, such as a gateway device, control panel, and/or monitoring server, through input/output port 218 to communicate the state of observational light source 203. For instance, because the lighting monitoring unit 210 may only be capable of being polled while it is receiving power from the lighting socket, a timely response to such polling may be indicative of the observational light source 203 being in an activated state. If the polling device (e.g., gateway device, control panel, and/or monitoring server) were not to receive a response from the lighting monitoring unit 210 following transmission of a polling/interrogation signal, then it may be concluded that the observational light source 203 is in an inactive state (e.g., turned off). In this way, bulbs with Z-Wave or WiFi functionality may be utilized as observational light sources in the lighting evaluation techniques described herein. In some implementations, one or more components of lighting monitoring unit 210 may be built into a standalone light switch. In this way, a state of a light switch may be monitored to determine when lights that are electrically coupled to the light switch are activated and deactivated.

Figure 3:
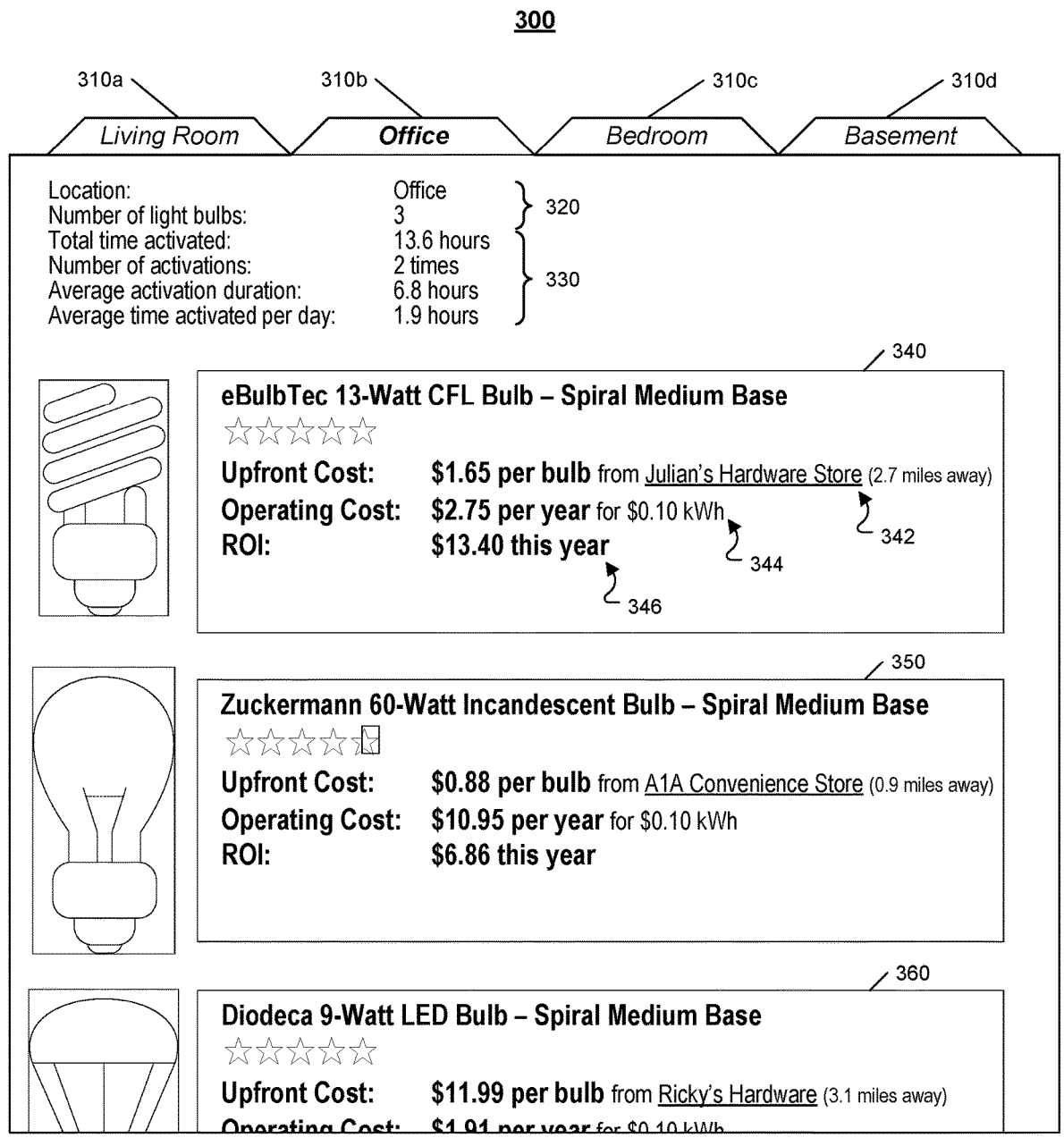
FIG. 3 illustrates an example interface for viewing information related to the performance of a lighting evaluation.

FIG. 3 illustrates an example interface 300 for viewing information related to the performance of a lighting evaluation. The interface 300 may, for instance, be provided to a user of a light source (e.g., an observational light source) in order to review results and recommendations generated on the basis of its lighting evaluation. The interface 300 may provide results interfaces 310a-310d for multiple different lighting evaluations performed. These different results interfaces 310a-310d may, for instance, correspond to a lighting evaluation conducted in the user's living room (310a), office (310b), bedroom (310c), and basement (310d). For example, the user may have utilized an observational light source to determine how to best light each room of their home. Such separate lighting evaluations may be performed using one or multiple observational light sources that are associated with the user. For instance, the user may have an observational light source for each location of the property being monitored such that all locations of the property are monitored concurrently, or may move an observational light source to different locations in the property such that all locations of the property are monitored, but at different periods of time. The interface 300 may be provided to one or more user devices, such as those described above in association with FIGS. 1 and 2.

In the example of FIG. 3, the results interface 310b for a lighting evaluation of a user's office is being presented by way of interface 300. Such an office may, for example, be similar to that of room 102 which has been described above in association with FIG. 1. The interface 300 may present existing lighting system information 320 for the user's review. This information may include the location of the existing lighting system, the geographical position of the location, the number of light bulbs at the location, the types of light bulbs at the location, local utility pricing information such as cost per kWh, local utility rebate information, and the like. Such information 320 may be provided by the user, one or more devices associated with a user's monitoring system, and/or one or more Internet sources.

The interface 300 may also present results 330 descriptive of one or more analyses performed on data collected by an observational light source. Results 330 may, for instance, be deduced by a device similar to that of remote monitoring server 160 which has been described above in association with FIG. 1. Information included in results 330 may include a total amount of time that the observational light source was activated, the number of times that the observational light was activated, the average duration of time of which the observational light source was activated, the average amount of time that the observational light source was activated per day, and the like. The results 330 as depicted in FIG. 3 may, for example, be determined on the basis of one week's worth of data collected by an observational light source. In addition, results 330 may be utilized in making one or more other determinations, such as the recommendations described in more detail below.

The interface 300 may include recommendations 340, 350, and 360. For example, these recommendations may provide insight to a user regarding one or more specific light bulb products. That is, a system such as that of electronic system 100 of FIG. 1 may recommend a particular light bulb to a user based on the data collected by an observational light source, information of 320, information of 330, and information obtained from other sources. The particular light bulb products recommended to the user may be those which the system has determined to be a best fit for the user's office, for instance. Given the different pieces of information available, such recommendations may be provided at the consideration of various factors.

The light bulb products considered for these recommendations may be those which are offered by retailers nearby the user. In some implementations, up-to-date pricing information for local retailers may be monitored by a remote monitoring server. In some examples, location information about the user's property may be utilized when performing such monitoring. The remote monitoring server may execute one or more operations to crawl Internet resources for information on various lighting products such as incandescent light bulbs, compact fluorescent lamp (CFL) bulbs, and light-emitting diode (LED) bulbs, for example.

In some implementations, the attributes of one or more of these light bulb products may be compared with one another as part of the lighting system evaluation. One or more rules, such as those described above, may specify that light bulb products are to be chosen on the basis of monetary savings that they may provide to the user. In other words, this process may seek to determine which light bulbs are most likely the cheapest for the user to purchase and use in the office's lighting system. For example, incandescent light bulbs are often the cheapest option for lighting sources that are typically activated for very short periods of time. On the other hand, CFL bulbs are likely the cheapest option for lighting systems that are rarely activated, but remain on for long periods of time when activated. LED bulbs are, at times, the cheapest option for lighting systems that are utilized in a significant capacity. These examples may not always hold true though, as the particular usage patterns of the room, natural lighting conditions of the room, local pricing of light bulb products, rebates for different types of lighting sources that are offered by local utility companies, and local pricing of electric utilities may have an impact on the ultimate selection.

In the example of FIG. 3, a compact fluorescent lamp (CFL) bulb may have been determined to be the most suitable light bulb technology for use in the lighting system of the user's office. In particular, a first recommendation 340 may suggest to the user that the eBulbTec 13-Watt CFL bulb may be the best-matched bulb for the user's office. This may, for instance, be due at least in part to the usage patterns of the office as indicated by the observational light source. The user may be presented with information regarding the upfront cost 342 of the CFL bulb. Specifically, the user may also be provided with information about where the bulb may be purchased, which in this example is Julian's Hardware Store. Hyperlinks to Julian's Hardware Store's official website, navigational instructions for traveling to Julian's hardware store, and/or a product information page for the eBulbTec CFL bulb may also be provided to the user in connection with the recommendation 340. In some implementations, some or all of the content included in these webpages may be provided and/or embedded within recommendation 340. An operating cost 344, which may be calculated based on attributes of the CFL bulb and the lighting system usage information for the office, may also be provided to the user. In this particular recommendation, it may have been determined that the CFL bulb would provide an anticipated return on investment (ROI) 346 that would be advantageous over the user's current lighting system. An ROI analysis may be performed for each light bulb product considered.

Each of recommendations 340, 350, and 360 are for light bulbs with medium spiral bases. This may, for instance, be a reflection of the lighting sockets available in the user's office. While CFL bulbs are recommended for the user's office, incandescent and/or LED bulbs may be more favorable options for other rooms in the user's household as determined on the basis of their usage patterns. Also, recommendations may change over time. For instance, if the prices for LED bulbs fall, such recommendations may lean more heavily toward LED bulbs. This is, for instance, one of the advantages of performing a lighting evaluation using current pricing data. In some implementations, projections for such pricing changes may also be presented to the user in interface 300. In some examples, additional analytics may be performed on light bulb pricing so as to create a customized lighting plan for the user which provides the cheapest options for a user over a span of years using pricing projections. For example, a plan created for a user may recommend that they utilize CFL bulbs in a room of their house for the next two years and then switch over to LED bulbs from the third year onward. In these implementations, an observational light source may be periodically installed and utilized so as to update details of the plan with current usage data. The techniques described above may also be performed so as to select light bulb products with a minimal environmental impact. For instance, usage data for each room may be utilized in conjunction with up-to-date lighting technology information so as to determine one or more light bulb products for a user to install that are cost effective and environmentally-friendly.

Figure 4:
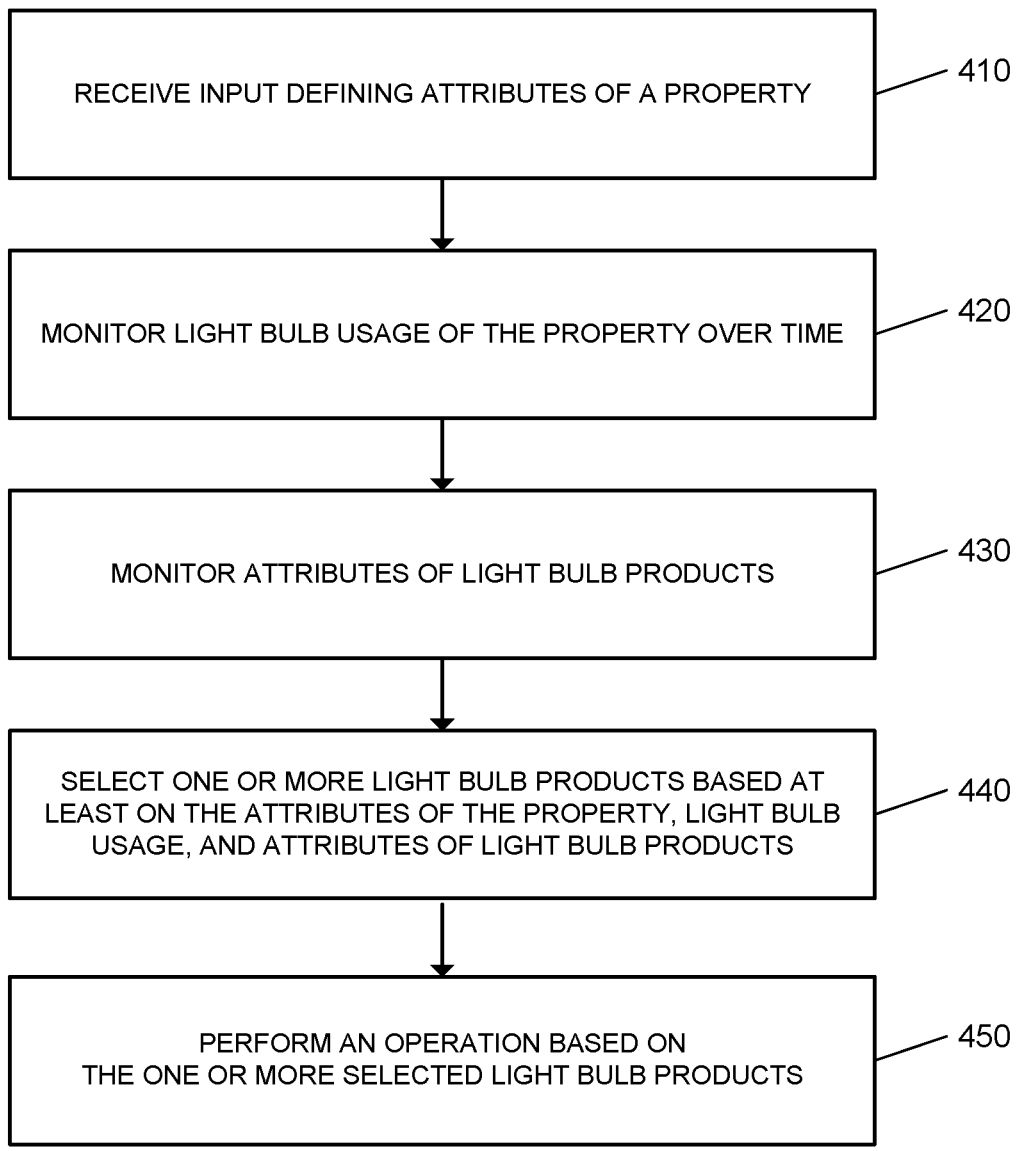
FIG. 4 is a flow chart illustrating an example process.

FIG. 4 is a flow chart of an example process 400. Input which defines attributes of a property may be received (410). For example, this may be some or all of the information described above in association with existing system information 320. Light bulb usage information may be monitored (420). This may, for example, include information collected by an observational light source that is provided to one or more devices with which the observational light source is in communication. Attributes of one or more light bulb products may be monitored (430). Such attributes may include type, wattage, fitting, ballast factor, lifetime, size, price, local availability, and the like for light bulb products. One or more of the light bulb products may be selected on the basis of the attributes of the property, the light bulb usage information, and the attributes of the light bulb products (440). This operation may, for instance, include comparing characteristics of various light bulb products in order to select a set of light bulb products which may be considered to be most suitable for the room in which the observational light source was implemented. Furthermore, various attributes of the property's electric utility provider may also be monitored and taken into consideration when selecting light bulb products. This may, for instance, include local utility pricing information and rebates that a resident of the property may be eligible to receive. Natural lighting conditions of the property may also be taken into account when selecting light bulb products. For instance, a room that receives relatively high amounts of natural lighting may not require powerful bulbs. An operation may be performed on the basis of the one or more selected light bulb products (450). This may include providing information about the one or more selected light bulb products. For instance, one or more recommendations may be provided to a user so as to suggest a light bulb product to be used.

Figure 5:
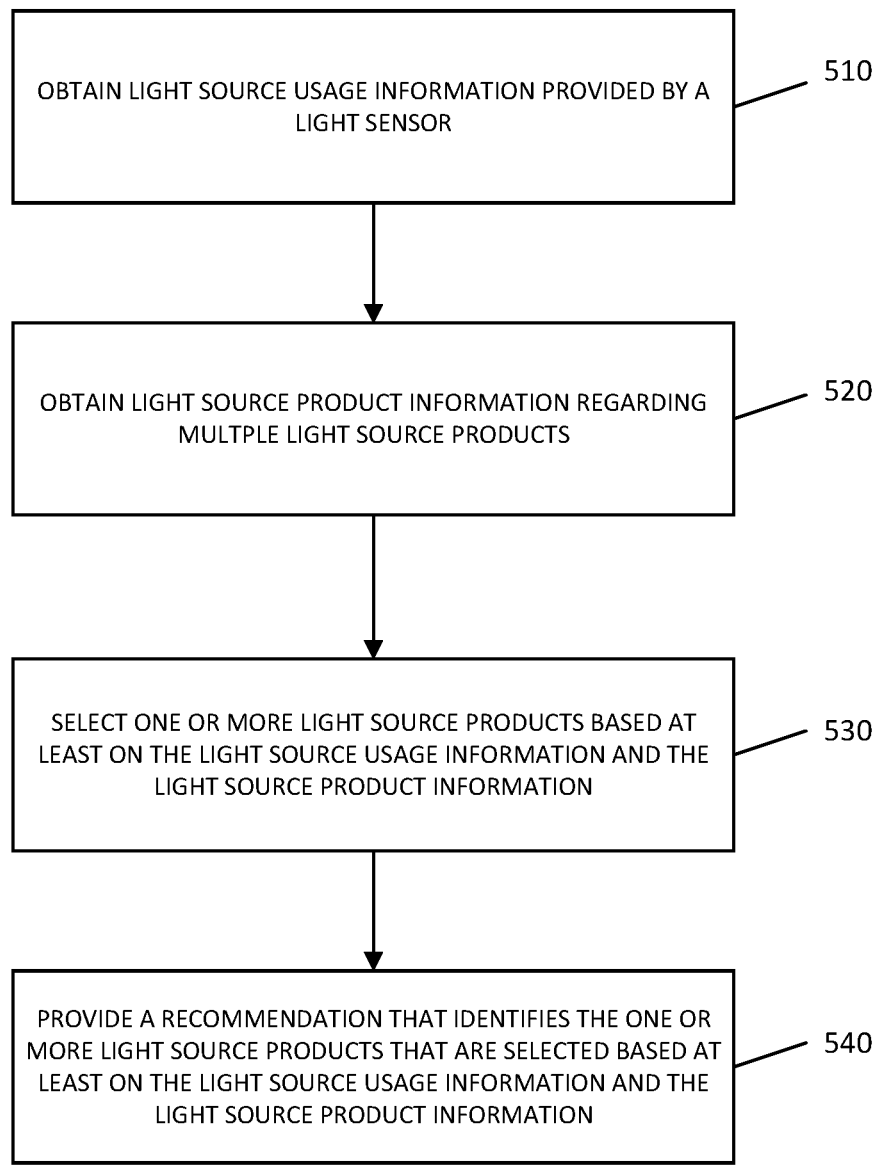
FIG. 5 is a flow chart illustrating an example process for providing a recommendation based on light source information.

FIG. 5 illustrates an example of a process 500 for providing a recommendation based on light source information. Briefly, the process 500 can include obtaining light source usage information provided by a light sensor (510), obtaining light source product information regarding multiple light source products (520), selecting one or more light source products based at least on the light source usage information the light source product information (530), and providing a recommendation that identifies the one or more light source products that are selected based at least on the light source usage information and the light source product information (540). While the remote monitoring server 160 can perform the process 500 for providing a recommendation based on light source information, some or all of the process 500 can be performed by the light sensor 216, the processor 211 of the lighting monitoring unit 210, the mobile device 140, the client device 150, alone or in any combination with the remote monitoring server 160.

The process 500 can include obtaining light source usage information provided by a light sensor (510). For example, the remote monitoring server 160 can obtain light source usage information from the light sensor 216 via the network 105. The light source usage information can describe a number of times that a light source 203 was activated, an amount of time that the light source 203 was providing light, the time periods that the light was on and the time periods that the light was off, and the like. For example, the remote monitoring server 160 may light source usage information that specifies that during a twenty four hour period the light was activated four times, the total duration that the light was turned on during the twenty four hour period, and the starting and stopping times for the light being on for the four times the light was turned on.

The light sensor 216 can be located within the light source 203. As such, the light sensor 216 can be utilized to detect when the light source 203 is activated and deactivated. For example, the light sensor 216 may determine that when the light sensor 216 is powered on the light source 203 is activated and when the light sensor 216 is powered off the light source 203 is deactivated. In another example, the light sensor 216 may detect the flow of current and detect when the light source 203 is activated and deactivated based on the flow of current. In the example, the light sensor 216 may detect when current is flowing through a filament, between electrodes in a gas filled bulb, or flowing through some other portion of the light source 203 and, in response to detecting that current begins flowing, determine that the light source 203 has been activated and, in response to detecting that current stops flowing, determine that the light source 203 has been deactivated. In some implementations, the light sensor 216 may detect the presence of light and detect when the light source 203 is activated and deactivated based on the presence of light. For example, the light sensor 216 may determine that a light source 203 has been activated when the light sensor 216 detects at least a certain amount of light that corresponds to the light source 203 providing light. In some implementations, the light sensor 216 may detect heat and detect when the light source 203 is activated and deactivated based on the presence of heat. For example, the light sensor 216 may determine that a light source 203 has been activated when the light sensor 216 detects at least a certain amount of heat that corresponds to the light source 203 providing light.

In certain aspects, the light source usage information can be obtained via a script that is provided to the light sensor 216. In this instance, the light source usage information can be measured and provided by the light sensor 216 in accordance with the script that is provided to the light sensor 216. For example, the remote monitoring server 160 may provide the light sensor 216 a script that specifies that the light sensor 216 should record timestamps for each time the light source 203 is activated or deactivated where the timestamps are labeled with an indication whether the light source 203 is activated or deactivated, and every time ten timestamps are recorded or every twenty four hours, whichever comes first, transmit the recorded labeled timestamps to the remote monitoring server 160.

The process 500 can include obtaining light source product information regarding multiple light source products (520). For example, the remote monitoring server 160 can obtain light source product information of multiple light products automatically, manually, or both. The light source product information can include one or more of wattage, prices, local availability, ballast factor, fitting, lifetime, size, or type of light sources.

In some aspects, the remote monitoring server 160 can automatically obtain the light source product information by crawling internet web resources to obtain the light source product information. The remote monitoring server 160 can crawl the internet web resources periodically, over predetermined intervals such as hourly, daily, weekly, and the like. For example, the remote monitoring server 160 may crawl webpages of suppliers of light products to identify light products available, current costs for the light products, and other information about the light source products.

In other aspects, the remote monitoring server 160 can manually obtain the light source product information via inputs at a mobile device 140, client device 150, or both. The light source product information can be input at the mobile device 140 and/or client device 150 via a graphical user interface. For example, a user may specify through a graphical user interface that a particular type of lightbulb with particular characteristics is available to the user for a particular price. The light source product information can be transmitted from the mobile device 140 and/or the client device 150 to the remote monitoring server 160 via the network 105. The process 500 can include selecting one or more light source products based at least on the light source usage information and the light source product information. For example, the remote monitoring server 160 may select the light source product that the remote monitoring server 160 determines has a required socket type for a particular socket in a room, provides at least a minimum wattage that a user requested, and has the least expected cost over their lifetime based on the number of activations, duration of activations, cost to acquire, and cost to run indicated by the light source usage information and the light source product information.

As such, the remote monitoring server 160 can be configured to select one or more light source products based on aggregated light source information. For example, the remote monitoring server 160 can select one or more light source products based on a location of the light source 203, the activation duration of the light source 203, and cost of the light source product. In this instance, the remote monitoring server 160 can determine that a particular room can hold up to eight lightbulbs, each lightbulb including a conventional, screw-type socket and providing an output of 800 lumens. The remote monitoring server 160 may select one or more light source products based on such information and calculate the respective costs for each of the one or more selected light source products. In certain aspects, the respective costs for the one or more selected light source products can include a fixed cost, such as the payment necessary up front, as well as a variable cost, such as an operating cost based on the light source usage information. Further, the operating costs of the one or more light source products can also include a cost for electricity in which certain light source products use more/less electricity when first activated, certain light source products have a longer/shorter activation lifetime, and certain light source products have a longer/shorter overall lifetime of use. As such, the light source usage information and the light source product information can be utilized by the remote monitoring server 160 as conditions to select the one or more light source products most suited for the room 102 based on the particular light source usage information and the light source product information.

Additionally, the remote monitoring server 160 can select one or more light source products based on the light source usage information and the light source product information in response to determining that the light source usage information is obtained for a period of time that satisfies a threshold time period, e.g., one week, two weeks, one month, or some other period of time. In this instance, the remote monitoring server 160 can select the one or more light source products after enough light source information is aggregated to identify patterns and trends in the light source usage information and the light source product information.

The process 500 can include providing a recommendation that identifies the one or more light source products that are selected based at least on the light source usage information and the light source product information. The remote monitoring server 160 can provide a recommendation that includes identifying an incandescent light source based on light source usage information that indicates that the light source has short activations with low total activation time. For example, the recommendation for the incandescent light source can be identified when the light source 203 is determined to be activated usually for three minutes at a time and has a total activation time of 5%. Short periods of time may be considered periods of time that are less than a predetermined amount of time, e.g., two minutes, five minutes, thirty minutes, etc. A low total activation time may be considered a percentage of time that is less than a predetermined percentage, e.g., 2%, 5%, 10%, etc.

The remote monitoring server 160 can also provide a recommendation that includes identifying a compact fluorescent light source based on light source usage information that indicates the light source has long activations with low or moderate total activation time. For example, the recommendation for the compact fluorescent light source can be provided when the light source 203 is determined to be activated usually for an hour long and has a total activation time of 30%. Long periods of time may be considered periods of time that are more than a predetermined amount of time, e.g., two minutes, five minutes, thirty minutes, etc. A moderate total activation time may be considered a percentage of time that is more than a first predetermined percentage, e.g., 2%, 5%, 10%, etc. but less than a second predetermined percentage, e.g., 50%, 60%, 65%, etc.

The remote monitoring server 160 can further provide a recommendation that includes identifying a light emitting diode light source based on light source usage information that indicates the light source has a long total activation time. For example, the recommendation for the compact fluorescent light source can be provided when the light source 203 has a total activation time of 90%. A long total activation time may be considered a percentage of time that is more than a predetermined percentage, e.g., 50%, 60%, 65%, etc. The remote monitoring server 160 can further provide a recommendation that includes identifying a light emitting diode light source based on light source usage information that indicates the light source has short activations with moderate total activation time. For example, the recommendation for the compact fluorescent light source can be provided when the light source 203 is typically activated for three minutes at a time and has a total activation time of 30%.

In certain aspects, the remote monitoring server 160 can provide multiple recommendations. For example, the remote monitoring server 160 may provide a recommendation of two, three, or some other of the light source products that are expected to have a least cost based on the light source usage information and the light source product information, while still satisfying lighting requirements. The multiple recommendations can be ranked based on weighted parameters including the light source usage information and the light source product information. As such, each parameter of the light source usage information and the light source product information can be given a weighted value so that a ranked list of recommendations can be generated. For example, a particular room may be more suited for light source products with a higher threshold of activation time rather than a higher frequency of activation. In this instance, the parameter of activation time may be weighted higher than the parameter of frequency of activation. As such, if two different light source products fit the necessary criteria with an equivalent cost, as determined by the remote monitoring server 160, the light source product which emphasizes activation time can be ranked higher in the list of multiple recommendations. Activation time may refer to amount of time needed for the light source to warm up. For example, a CFL may have a warm up time of three minutes.

In some aspects, the weighted values of the parameters are generated automatically at the remote monitoring server 160. In other aspects, the weighted values of the parameters are input manually via the mobile device 140, the client device 150, or both, and the weighted values are transmitted to the remote monitoring server 160 via the network 105. The ranked list can be generated by the remote monitoring server 160 and then transmitted to the client device 150 and/or the mobile device 140 via the network 105.

In some aspects, the recommendation that identifies the one or more light source products that are selected based on the light source usage information and the light source product information further includes providing a graphical user interface, as described in an implementation of the present disclosure in FIG. 3. The graphical user interface can include one or more of a location of the light sensor 216, a number of light sources 203, the light source usage information, the light source product information, the recommendation, and the ranked list of recommendations. The graphical user interface can be utilized to review results and recommendations generated on the basis of the light source information evaluation. The interface can present results descriptive of one or more analyses performed on data collected at one or more particular light sources in a respective room. Further, the graphical user interface can elaborate on the recommendations and provide an explanation as to why each of the one or more light source products was recommended in the first place. In certain aspects, the user can be able to alter the light source usage information to adjust the recommendations. In this instance, the user can input light source usage information that has not been detected by the light sensor 216, such as different activation times, a lesser number of light source products to yield the same light output, a higher wattage per light source product, and the like. Additionally, the user can alter the weights of each parameter if a particular parameter may be more suited to a particular room. For example, the user can prefer local availability and therefore add a greater weight to the local availability parameter. In this instance, the remote monitoring server 160 can adjust the recommendations and then display the adjusted recommendations at the graphical user interface accordingly.

The process 500 can further include obtaining property attribute information that describes attributes of a property, wherein selecting one or more light source products is based on the light source usage information, the light source product information, and the property attribute information. The property attribute information can be utilized by the remote monitoring server 160 to provide the recommendation. For example, the property attribute information can be obtained by determining a light profile for a room in the property that describe trends in an amount of light measured in a room. In this instance, the light profile for the room can be utilized with the light source usage information, the light source product information, or any combination thereof, by the remote monitoring server 160 to provide a recommendation of one or more light source products. In certain aspects, the light profile can include artificial light measured in thy room based on the light sources 203 located within the room. In other aspects, the light profile can include ambient light measured in the room. The ambient light can be utilized by the remote monitoring server 160 to aid in the determination of the recommendation of one or more light source products. In this instance, the remote monitoring server 160 can provide a comparison between the measured ambient light and a light threshold. As such, if the ambient light falls below a light threshold, the recommendation can include one or more light source products. Otherwise, if the ambient light satisfies the light threshold, the recommendation can include no light source products.

Described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Suitable processors include, for example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A computer-implemented method comprising:
obtaining, by a monitoring system of a property, light source usage information provided by a light sensor that is integrated in a light monitoring unit of the light source, wherein the light source usage information indicates a number of times that a light source was activated during a period of time;
obtaining, by the monitoring system, sensor data from the light monitoring unit, wherein the sensor data is received using the light sensor and describes attributes of different types of light detected in a room at the property that includes the light source;
monitoring, based on the light source usage information and the attributes of the different types of light detected in the room, a lighting usage pattern of the light source for the room;
determining from the lighting usage pattern, that an amount of time the light source was activated satisfies a time threshold;
in response determining the amount of time satisfies the time threshold, selecting an incandescent light source instead of an non-incandescent light source based at least on the lighting usage pattern and light source product information obtained by the monitoring system; and
providing a recommendation that identifies the selected incandescent light source of the multiple light source products.

2. The computer-implemented method of claim 1, wherein the light sensor comprises a light source that detects when the light source is activated and deactivated.

3. The computer-implemented method of claim 1, wherein obtaining light source usage information provided by a light sensor further comprises:
providing a script to the light sensor, and
receiving light source usage information that is measured and provided by the light sensor in accordance with the script.

4. The computer-implemented method of claim 1, wherein the light source product information describes one or more of:
   wattage, prices, local availability, ballast factor, fitting, lifetime, size, or type of the light sources.

5. The computer-implemented method of claim 1, further comprising:
   obtaining light source product information regarding multiple light source products by crawling internet web resources to obtain the light source product information.

6. The computer-implemented method of claim 1, wherein providing a recommendation that identifies the selected incandescent light source of the multiple light source products further comprises:
   providing a graphical user interface that includes one or more of a location of the light sensor, a number of light sources, the light source usage information, the light source product information and the recommendation.

7. The computer-implemented method of claim 1, wherein providing a recommendation that identifies the selected incandescent light source of the multiple light source products further comprises:
   providing a recommendation that includes one or more of:
      identifying an incandescent light source based at least on light source usage information that indicates that the light source is frequently activated for short periods of time,
      identifying a compact fluorescent light source based at least on light source usage information that indicates that the light source is infrequently activated for long periods of time, or
      identifying a light emitting diode light source based at least on light source usage information that indicates that the light source is activated for a total significant amount of time.

8. The computer-implemented method of claim 1, further comprising:
   obtaining property attribute information that describes attributes of the property, wherein selecting one or more light source products is based at least on the light source usage information, the lighting usage pattern, the light source product information, and the property attribute information.

9. The computer-implemented method of claim 8, wherein the property attribute information that describes attributes of the property comprises:
   determining a light profile for the room in the property that describes trends in an amount of light measured in a room.

10. An electronic system comprising:
    at least one processor; and
    at least one computer-readable storage medium coupled to the at least one processor having stored thereon instructions which, when executed by the at least one processor, causes the at least one processor to perform operations comprising:
       obtaining, by a monitoring system of a property, light source usage information provided by a light sensor that is integrated in a light monitoring unit of the light source, wherein the light source usage information indicates a number of times that a light source was activated during a period of time;
       obtaining, by the monitoring system, sensor data from the light monitoring unit, wherein the sensor data is received using the light sensor and describes attributes of different types of light detected in a room at the property that includes the light source;
       monitoring, based on the light source usage information and the attributes of the different types of light detected in the room, a lighting usage pattern of the light source;
       determining from the lighting usage pattern, that an amount of time the light source was activated satisfies a time threshold;
       in response determining the amount of time satisfies the time threshold, selecting an incandescent light source instead of an non-incandescent light source based at least on the lighting usage pattern and light source product information obtained by the monitoring system; and
       providing a recommendation that identifies the selected incandescent light source of the multiple light source products.

11. The system of claim 10, wherein obtaining light source usage information provided by a light sensor further comprises:
    providing a script to the light sensor, and
    receiving light source usage information that is measured and provided by the light sensor in accordance with the script.

12. The system of claim 10, wherein the operations further comprise:
    obtaining light source product information regarding multiple light source products by crawling internet web resources to obtain the light source product information.

13. The system of claim 10, wherein providing a recommendation that identifies the selected incandescent light source of the multiple light source products further comprises:
    providing a recommendation that includes one or more of:
       identifying an incandescent light source based at least on light source usage information that indicates that the light source is frequently activated for short periods of time,
       identifying a compact fluorescent light source based at least on light source usage information that indicates that the light source is infrequently activated for long periods of time, or
       identifying a light emitting diode light source based at least on light source usage information that indicates that the light sources is activated for a total significant amount of time.

14. The system of claim 10, the operations further comprising:
    obtaining property attribute information that describes attributes of the property, wherein selecting one or more light source products is based at least on the light source usage information, the lighting usage pattern, the light source product information, and the property attribute information.

15. One or more non-transitory computer-readable media storing software comprising instructions executable by one or more computers, which, upon such execution, cause the one or more computers to perform operations comprising:
    obtaining, by a monitoring system of a property, light source usage information provided by a light sensor that is integrated in a light monitoring unit of the light source, wherein the light source usage information indicates a number of times that a light source was activated during a period of time;

obtaining, by the monitoring system, sensor data from the light monitoring unit, wherein the sensor data is received using the light sensor and describes attributes of different types of light detected in a room at the property that includes the light source;

monitoring, based on the light source usage information and the attributes of the different types of light detected in the room, a lighting usage pattern of the light source for the room;

determining from the lighting usage pattern, that an amount of time the light source was activated satisfies a time threshold;

in response determining the amount of time satisfies the time threshold, selecting an incandescent light source instead of an non-incandescent light source based at least on the lighting usage pattern and light source product information obtained by the monitoring system; and providing a recommendation that identifies the selected incandescent light source of the multiple light source products.

16. The non-transitory computer-readable media of claim 15, wherein obtaining light source usage information provided by a light sensor further comprises:

providing a script to the light sensor, and receiving light source usage information that is measured and provided by the light sensor in accordance with the script.

17. The non-transitory computer-readable media of claim 15, wherein providing a recommendation that identifies the selected incandescent light source of the multiple light source products further comprises:

providing a recommendation that includes one or more of:

identifying an incandescent light source based at least on light source usage information that indicates that the light source has short activations with low total activation time, identifying a compact fluorescent light source based at least on light source usage information that indicates that the light source has long activations with low or moderate total activation time, identifying a light emitting diode light source based at least on light source usage information that indicates that the light source has long total activation time, or identifying a light emitting diode light source based at least on light source usage information that indicates that the light source has short activations with moderate total activation time.

18. The method of claim 1, comprising:

generating, by the monitoring system, a light profile that indicates trends in an amount of light produced by different types of light in the room, wherein the light profile is generated based on the light source usage information and the sensor data that describes the attributes of different types of light in the room.

19. The method of claim 1, wherein the light source is integrated along the same circuit as a plurality of other light sources in the room at the property and obtaining the light source usage information comprises:

obtaining light source usage information that is representative of usage patterns for an entirety of a lighting system included in the room based on the light source being integrated along the same circuit as the plurality of other light sources.

* * * * *

UNITED STATES PATENT AND TRADEMARK OFFICE
CERTIFICATE OF CORRECTION

PATENT NO. : 10,740,821 B1
APPLICATION NO. : 15/203952
DATED : August 11, 2020
INVENTOR(S) : David James Hutz Page 1 of 1

It is certified that error appears in the above-identified patent and that said Letters Patent is hereby corrected as shown below:

On the Title Page

Item (56), Column 2 (Other Publications), Line 2, delete "lampsades," and insert -- lampshades, --, therefor.

Signed and Sealed this
Twentieth Day of October, 2020

Andrei Iancu
*Director of the United States Patent and Trademark Office*